(12) United States Patent
Amsden et al.

(10) Patent No.: US 8,354,083 B2
(45) Date of Patent: Jan. 15, 2013

(54) MULTI-TUBULAR REACTORS WITH MONOLITHIC CATALYSTS

(75) Inventors: Jeffrey M. Amsden, Hammondsport, NY (US); Gildas Boulc'h, Avon (FR); Achim K. Heibel, Corning, NY (US); Neil E. Partridge, Avoca, NY (US)

(73) Assignee: Corning Incorporated, Corning, NY (US)

( * ) Notice: Subject to any disclaimer, the term of this patent is extended or adjusted under 35 U.S.C. 154(b) by 665 days.

(21) Appl. No.: 12/404,531

(22) Filed: Mar. 16, 2009
(Under 37 CFR 1.47)

(65) Prior Publication Data

US 2009/0176895 A1    Jul. 9, 2009

Related U.S. Application Data

(63) Continuation of application No. 10/750,472, filed on Dec. 31, 2003, now abandoned.

(51) Int. Cl.
*B01J 8/06* (2006.01)
(52) U.S. Cl. ............. 422/651; 422/653; 29/890; 29/434
(58) Field of Classification Search ............... 29/890, 29/434; 422/653, 651
See application file for complete search history.

(56) References Cited

U.S. PATENT DOCUMENTS

| | | | | |
|---|---|---|---|---|
| 1,057,159 A | * | 3/1913 | Madsen | 29/446 |
| 3,890,104 A | * | 6/1975 | Porta et al. | 422/654 |
| 4,377,335 A | * | 3/1983 | Fannon et al. | 399/339 |

FOREIGN PATENT DOCUMENTS

| EP | 1110605 A1 | * | 6/2001 |
|---|---|---|---|
| GB | 2103953 A | * | 3/1983 |

OTHER PUBLICATIONS

Oberg et al. Machinery's Handbook, 26th Edition. 2000. pp. 621-627.*

* cited by examiner

*Primary Examiner* — Jennifer A Leung
(74) *Attorney, Agent, or Firm* — Joseph M. Homa

(57) ABSTRACT

Multi-tubular reactors for fluid processing incorporate reactor tubes containing thermally conductive monolithic catalyst structures with relative dimensions and thermal expansion characteristics effective to establish both a non-interfering or slidably interfering fit between the monolith structures and the reactor tubes at selected monolith mounting temperatures, and geometries at reactor operating temperatures such that the operating gaps between tubes and monoliths under the conditions of reactor operation do not exceed about 250 μm over tube sections where high heat flux to or from the monoliths is required.

5 Claims, 2 Drawing Sheets

MULTI-TUBULAR REACTORS WITH MONOLITHIC CATALYSTS

CROSS-REFERENCE TO RELATED APPLICATIONS

This application is a continuation of and claims the benefit of priority to U.S. patent application Ser. No. 10/750,472, filed on Dec. 31, 2003, now abandoned, the content of which is relied upon and incorporated herein by reference in its entirety.

BACKGROUND OF THE INVENTION

The present invention relates to the use of monolithic catalysts in multi-tubular catalytic reactors. More particularly, the invention relates to catalyst designs and methods for inserting, securing, and maintaining monolithic catalysts in the tubes of such reactors, or in shell-and-tube heat exchangers, for use in the chemical processing and/or energy conversion industries.

Tubular catalytic reactors wherein a reactant stream is passed through a tube containing a bed of catalyst pellets, rings, spheres, or the like are presently used for the industrial production of chemicals in a variety of processes. These include processes involving highly exothermic or endothermic reactions wherein the management of the heat of reaction is required for process control. Examples of highly exothermic reactions include the selective catalytic oxidation of organic compounds e.g., the oxidation of benzene or n-butane to maleic anhydride, o-xylene to phthalic anhydride, methanol to formaldehyde, ethylene to ethylene oxide, and Fischer-Tropsch synthesis. Highly endothermic reactions include the steam reforming of hydrocarbons to syngas (CO and $H_2$). For all of these reactions, effective heat management can significantly affect key process parameters including catalyst efficiency, reaction selectivity, adequate catalyst life, and even reactor safety.

Tubular reactors are relatively efficient but can be difficult to control. In the case of exothermic reactions for example, hot spots can occur which can adversely affect reactor performance. Due to effects such as process stream flow channeling and the fact that the effective thermal conductivity of the reaction system (catalyst pellets plus gaseous reactants) is quite low, localized heating that increases exothermic reaction rates can produce thermal runaways. Uncontrolled, these can eventually lead to catalyst sintering or melting, damage to metal reactor envelopes, and even to reactor explosions. Approaches to deal with these concerns have included processing strategies such as staging the catalysts or diluting the reactants, the latter through means such as reaction moderators, product recycling or the use of inert diluents, but such strategies invariably reduce process efficiencies.

Multi-tubular reactors offer a more efficient method for securing reaction zone temperature control. These reactors typically contain a large number of tubes, typically of the order of centimeters in diameter, loaded with packed pellet catalysts. The range of reaction zone temperature control can be increased by reducing tubular reactor diameter and/or increasing the volume, flow, or heat capacity of the various heat exchange fluids such as gases, water, thermal oil, and molten salts that have been used. Further, flow-channeling effects of the kind leading to thermal runaways in pelletized catalyst beds can be minimized or eliminated through the substitution of structured packings, e.g., monolithic or honeycomb catalysts, for the pelletized catalysts in the tubes.

The use of thermally conductive, structured metal honeycomb catalysts to improve thermal uniformity in tubular reactors has been proposed in publications by E. Tronconi and G. Groppi, including "Design Of Novel Monolith Catalyst Supports For Gas/Solid Reactions With Heat Exchange", Chem. Eng. Sci. 55 (2000), 2161-2171. Modeling work by these authors and others suggest that appropriately designed conductive monoliths could offer significant reductions in catalyst temperature gradients in tubular reactors via heat conduction through the interconnected walls of the monoliths. However, problems relating to overall reactor temperature control remain.

One difficulty with any of the multi-tubular reactor designs so far considered is that the heat generated or required by the reaction must still be supplied or removed through the tube walls via the heat exchange medium present in the space in between the reactor tubes. Thus a major contributor to the problem of catalyst superheating in exothermic reactions is the physical limitation on internal heat transfer performance that can be achieved in these reactors. This physical limitation, expressed commonly as the heat transfer coefficient or the effective radial thermal conductivity of the reactor, is frequently still too low in comparison with the amount of heat evolved inside the reactor tube to enable the level of reactor temperature control needed to realize theoretical reactor efficiencies.

Monolithic catalysts to be used in multi-tubular reactors themselves present additional practical difficulties, specifically problems relating to the efficient loading and fitting of the catalysts into commercial reactor tubes. Neither the reactor tubes nor the catalysts themselves are ideal in shape, and therefore gaps between the catalysts and the tube walls inevitably remain. Such gaps further increase the heat transfer resistance between the catalyst and heat transfer fluid within the reactor. Thus improved methods for packaging monolithic catalysts in reactor tubes are needed to minimize the resistance to heat transfer arising from the series of interfaces and materials disposed between the catalyst and the heat transfer fluid within the reactor.

SUMMARY OF THE INVENTION

The present invention relates to multi-tubular reactors incorporating monolithic catalysts, and to methods for packaging monoliths in the tubes of multi-tubular reactors to maximize the radial heat transfer efficiency across the monolith-reactor tube interface. Factors that negatively impact the overall heat transfer capacity of these systems, including, for example, residual gaps between the monoliths and the reactor tubes, are directly addressed.

In one aspect, then, the invention includes an improved multi-tubular reactor for the processing of fluid reactant streams. The reactor comprises an array of catalyst-filled reactor tubes disposed in a reservoir of circulating heat-exchange fluid, with the catalyst in the reactor tubes including at least one monolithic catalyst or catalyst support structure. The monolithic catalyst provided in the tubes will be formulated and configured to process the fluid reactant stream at temperatures within a designed or pre-determined processing temperature range that will depend on the particular reaction to be conducted.

To meet fundamental heat transfer requirements for these reactors, the monolithic catalyst or catalyst support structure will be formed of a heat-conductive material such as a metal. The metal selected will have a known average linear coefficient of thermal expansion, hereinafter sometimes called the first coefficient of thermal expansion, and the monolith itself will have sufficient wall thickness and material density to insure that intra-monolith heat conductivity is not a barrier to heat transfer to and from the reactant stream at temperatures in the pre-determined fluid processing range.

The reactor tubes are also formed of a heat-conductive material such as a metal, that metal again having a known average linear coefficient of thermal expansion sometimes referred to hereinafter as the second coefficient of thermal expansion. The reactor tubes will also have a wall thickness and material density effective to insure that the heat conductivity of the tubes will not be a barrier to heat transfer to and from the heat-exchange fluid at reactor operating temperatures.

Finally, to meet the more stringent heat transfer requirements needed for efficiently carrying out highly exothermic or endothermic reactions in these reactors, the dimensions and coefficients of expansion of the monolith segments and reactor tubes are selected to reduce or substantially eliminate monolith-segment/reactor-tube gaps that might otherwise interfere with heat transfer between the segments and the tube walls of the reactor. For purposes of the present invention the monolith/reactor tube gap of interest is referred to as the operating monolith/tube gap. This gap depends on the dimensions of the monolith/reactor tube system, the thermal expansion characteristics of the monolith and tube, and the actual operating temperatures of the monolith and tube while mounted in the reactor and under actual use. To meet the heat transfer requirements of the invention the operating gap between the reactor tubes and the monolithic catalyst or catalyst support structure is reduced to a value not exceeding about 250 μm under the targeted operating conditions of the reactor for the reaction and catalyst involved in the selected process.

In a second aspect the invention includes a method for assembling a multi-tubular reactor incorporating an array of reactor tubes filled with one or more monolith segments of a monolithic catalyst or catalyst support. A segment of a monolithic catalyst or catalyst support structure is first selected, the segment being formed of a heat-conductive material having a first average linear coefficient of thermal expansion and being of a design and formulation effective to efficiently process a fluid within the aforementioned processing temperature range. Also selected is a reactor tube formed of a heat conductive material and having a second average linear coefficient of thermal expansion.

A particularly important aspect of monolith segment and reactor tube selection is that of insuring the proper relative sizing of the segment and/or tube. First, these components must be relatively sized to dimensions effective to provide a non-interfering or slidably interfering fit between the monolith segment and the reactor tube, at least when the tube is at a higher temperature than the segment. Secondly the relative sizing of the segment and tube must be set to insure that, when the segment within the tube is filled with fluid at a temperature in the processing temperature range for the reactor, the operating gap between the reactor tube and the segment will not exceed about 250 μm. Larger operating gap distances will degrade reactor performance due to poor heat transfer; zero or near zero averaged gap distances are preferred.

Finally, following appropriate sizing of these components the monolith segment is inserted in the tube. Depending on the relative sizes of the components, insertion may be with both the segment and tube at the same temperature, or with the tube at a higher temperature than the segment to provide the necessary non-interfering or slidably interfering fit between the components.

Mechanical means for retaining the monolith segment within the tube may be provided, and may even be preferred where multiple catalyst segments are disposed within the same tube. However, static friction between the segment(s) and tube that can increase as fluid in the processing temperature range passes through the tubes during reactor operation is normally sufficient for that purpose. As will hereinafter be more fully described, selecting monolith segments and reactor tubes with sufficiently different average linear coefficients of thermal expansion can insure that frictional segment retention is all that is required.

DESCRIPTION OF THE DRAWINGS

The invention is further described with reference to the appended drawings, wherein.

DETAILED DESCRIPTION

Figure 1:
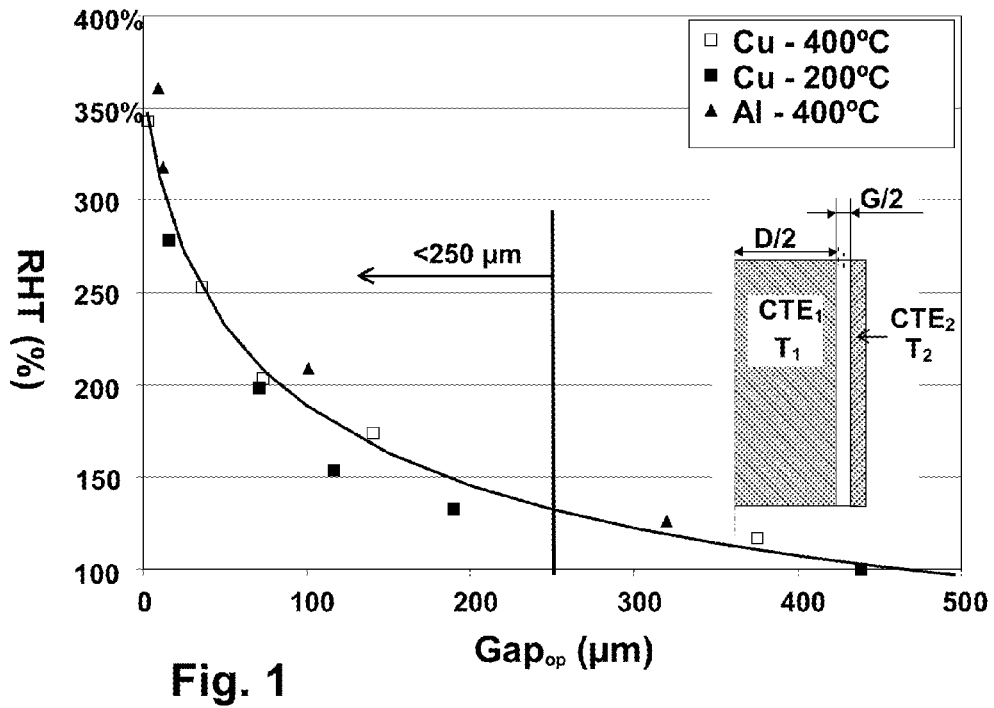
FIG. 1. is a graph plotting heat exchange efficiency against operating gap ($Gap_{op}$) for various monolith-reactor tube combinations provided according to the invention.

The effectiveness of the present invention for improving multi-tubular reactor efficiencies can be better appreciated when it is recognized that a single high heat flux resistance in a series of low heat flux resistances will act as thermal "bottleneck", limiting the amount of heat transfer across the entire series. In such cases no reductions in the latter resistances will have any significant effect on heat flow into or from the reactor. In the case of a multi-tubular reactor incorporating highly conductive metal monolithic catalyst supports and reactor tubes, internal heat flux resistances are generally low, except for the resistance presented by the gap between the monoliths and the inside walls of the tubes. The heat transfer resistance of this gap can vary depending on its size and fluid content, but is typically the largest resistance along the path from the fluid to the outer surfaces of the reactor tubes, particularly where the gap spaces are filled with static air.

Other resistances to heat flux within these reactors cannot be neglected while addressing the gap space problem. For practical reasons of fabrication, handling, shipping and catalyst deposition the monolith catalysts or catalyst supports to be employed in multi-tubular reactors should not be too long. Typically multiple monolith blocks or segments will be used that are shorter than the lengths of the reactor tubes, in order to better facilitate insertion and removal from the tubes for catalyst regeneration or replacement purposes.

To insure adequate axial heat transfer between stacked monolith segments in such reactors, the segments should be in physical contact with each other, or with inter-segment bridging elements of high thermal conductivity. Springs or other pressure-generating means can be employed to maintain close contact and good thermal conductivity between monolith segments in such stacks, but none of the measures employed to address this concern can be permitted to increase radial heat flux from the monolith segments to the reactor tube walls.

The control of radial heat flux in accordance with the invention depends directly on controlling the operating gap ($Gap_{op}$) between the monolith segments and the reactor tube walls. As noted above, the size of that operating gap, which should not exceed 250 um, will depend directly on the dimensions, thermal expansion properties and operating conditions of both the monolith and reactor tube elements of the system. More specifically, the operating gap $Gap_{op}$ is defined for the purpose of the present description by the expression:

$$Gap_{op} = Gap(T_0) - D \cdot [CTE_2 \cdot (T_2 - T_0) - CTE_1 \cdot (T_1 - T_0)]$$

wherein $Gap(T_0)$ is the difference between the monolith OD and the tube ID when both are at ambient temperature $T_0$, (typically 25° C.), D is the average diameter of the monolith-tube system, taken as the ½ the sum of the monolith OD and tube ID, $CTE_1$ and $CTE_2$ are the average linear thermal expansion coefficients of the monolith and tube, respectively, and $T_1$ and $T_2$ are, respectively, the local operating temperatures of the monolith and reactor tube over the monolith and reactor tube lengths designed for high heat flux when both are operating under the designed operating conditions for the reactor as the reaction of interest is being carried out. Where the diameters of the monolith and/or the reactor tube are variable or irregular over those monolith and reactor tube lengths, average OD and ID values are used.

The importance of gap control for the control of radial heat flux is experimentally demonstrated via experiments that measure heat transfer rates across monolith-reactor tube gaps of various sizes. The measurements are of heat flow from a conductive monolith segment to a reactor or heat-exchanger tube surrounded and kept at constant temperature by a heat-exchange fluid circulating around the outside of the tube.

In one useful testing arrangement, a cylindrical metal honeycomb monolith segment of 2.85 cm diameter and 25 cm length is positioned within a steel reactor tube of 30 cm length around which cooling water at 20° C. is continuously circulated. Heated air is forced through the monolith segment while using a mass flow controller and thermocouples at the entrance and exit ends of the monolith to measure air flow volume and temperature drop. Using the geometry of the heat exchanger tube, the air inlet and outlet temperatures, the water temperature, and the air mass flow data the overall heat transfer efficiency $h_{eff}$ can be calculated using the following equation:

$$h_{eff} = \rho \cdot c_p \cdot \phi_G / L \cdot (\ln((T_{air\,in} - T_{water})/(T_{air\,out} - T_{water})))$$

wherein $\rho$ is the density of the gas at standard temperature and pressure, $c_p$ is heat capacity of the gas, $\phi_G$ is volumetric flow rate of the gas at standard temperature and pressure, and L is length of the monolith test section.

In carrying out such tests, it is important to maintain the 20° C. thermal boundary condition along the whole length of the heat exchanger tube. Thus the water flow rate is set high enough so that the difference between water inlet and outlet temperature remains below 0.1° C., or more preferably so that the measured heat exchange rates cannot be increased by increasing the water flow rate.

Gas flows appropriate for a testing system of this geometry are in the range of 0.5 kg/s/m² to 20.7 kg/s/m², although radial heat transfer within metal monolith segments occurs mainly through wall conduction and is largely independent of gas flow rate. However, testing at high gas flow rates (or high Peclet numbers corresponding to a high convective/conductive transport ratio process) does help to minimize the impact axial conductivity as well as gas-solid heat-transfer restrictions on the results.

Data representative of the heat transfer efficiencies observed in a testing arrangement such as above described are reported in Table 1 below. Heated gas flow conditions appropriate for generating such data comprise flowing nitrogen at a temperature of 200 and 400° C. and a flow rate of 17 kg/s/m². The copper (Cu) monolith segments tested typically consist of highly conductive extruded copper monoliths of the kind described in published U.S. Patent Application No. US-2003-0100448-A1, all monolith segments supporting smooth skin layers of over-applied copper tubing. The copper monoliths have square channels with a diameter of 0.92 mm.

Aluminum (Al) monoliths of the type typically employed in these tests are machined out of aluminum blocks and incorporate round through-channels with channel diameters of 1.52 mm. The aluminum monolith segments are 25 mm long and assembled with aligned channels to a total length of 250 mm for testing.

The comparative values of heat exchange efficiency shown in Table 1 correspond to percentage increases in heat transfer efficiency over a "base" system consisting of a copper monolith segment sized to leave an approximate 500 µm gap between the smooth monolith skin and the smooth inside wall of the heat exchanger tube at room temperature assembly conditions. The "base" system data is typically generated at a heated nitrogen inlet gas temperature of 200° C.

The use of two different nitrogen temperatures as well as two different monolith materials of different expansion coefficients and geometry as set out in Table 1 helps to illustrate the interplay of geometry and thermal expansion which must be considered in order to achieve an overall efficient package for heat-transfer. In determining the operating gap size, i.e. the gap size under operating conditions which is the relevant parameter for gauging system heat-transfer performance, the logarithmic mean temperature based on the gas in- and outlet temperature and the temperature of the tube is applied.

$$\Delta T_{log.mean} = (T_{gas,in} - T_{gas,out})/\ln((T_{gas,in} - T_{tube})/(T_{gas,out} - T_{tube}))$$

This approach assumes equilibrium between the gas and solid temperatures.

The gap size data reported in Table 1 are initial or ambient temperature tube/monolith gap sizes, in microns. The operating gap ($Gap_{op}$) dimensions in these examples will in all cases be somewhat lower than the reported ambient temperature gaps $Gap(T_o)$ due to the relative thermal expansion coefficients of steel, copper and aluminum and the high temperatures of the gas passing through the monoliths.

TABLE 1

Relative Heat Transfer Efficiencies

| Initial Gap ($T_0$) | Metal\ N₂ Temperature | | |
|---|---|---|---|
| | Cu\ 200° C. | Cu\ 400° C. | Al\ 400° C. |
| 64 µm | 278% | 343% | 361% |
| 127 µm | 198% | 253% | 318% |
| 178 µm | 154% | 203% | |
| 254 µm | 133% | 174% | 209% |
| 508 µm | 100%* | 117% | 126% |

*Base case

As the data in Table 1 above clearly reflect, decreasing gap size directly affects heat exchange rates in multi-tubular reactors provided with monolithic catalysts. Also apparent is the fact that the effects of gap reduction will vary depending upon the composition and configuration of the system.

FIG. 1 of the drawing is a plot of heat exchange efficiency, shown in terms of percent relative heat transfer RHT(%), versus the operating gap ($Gap_{op}$) size between the monolith and tube wall, in micrometers under conditions similar to those employed to generate the data reported in Table 1. The relative heat transfer (RHT) values are plots as percent in excess of the base heat transfer for the case of a 500 μm operating gap; operating gaps $Gap_{op}$ are reported in micrometers. The data plotted in FIG. 1 represent a series of three test configurations, similar to those reported in Table 1, including tests of copper monoliths at two temperatures and aluminum monoliths at one temperature. The desirable operating gaps below 250 μm are indicated by the arrow, while the inset indicates the parameters affecting the operating gap calculations on a schematic diagram of a monolith-tube operating gap.

FIG. 1 clearly demonstrates that the gap size under operating conditions directly controls heat flux for all configurations tested, with significant increases in heat transfer efficiency commencing at about the same gap size regardless of the specific monolith configuration under test. It is therefore possible to achieve almost any targeted heat-transfer performance by selecting the appropriate initial geometric dimensions of the monolith OD and tube ID in light of the properties of the materials and the temperatures of the operating environment. Of course, the thermal expansions of the construction materials and the size of the gaps under assembly conditions, whether at ambient temperatures or otherwise, can impose practical limits on attainable operating gap sizes in many cases.

Based on data such as shown in Table 1 and FIG. 1 it appears that operating gap sizes over about 250 μm can result in significantly reduced heat exchange efficiencies, and thus reactors that may provide no substantial heat flux advantage over current reactors employing pelletized catalysts. Accordingly, gap sizes not exceeding that threshold should generally be maintained.

Of course the size of the operating gap between the monolith and tube may vary about the circumference of the monolith to the extent that the circumferential shape of the monolith does not exactly match that of the tube. Small variations in gap size can generally be tolerated, but large uncontrolled gap variations, caused for example, by excessive surface roughness on either the skin surfaces of the monoliths or the inside surfaces of the tubes, can substantially interfere with heat flow and are generally to be avoided.

On the other hand, controlled variations in the size of the operating gap can be used as a means for better controlling reaction temperatures in the operating environment of the reactor. These gap size variations can be radial, i.e., involve grooves or other designed variations in the shape of the monolith outer surface to control the circumferential profile of the monolith, or they can be axial, involving circumferential grooves or even successive segments of monoliths in a stack that differ in outer size and/or shape to change the operating gap for each segment.

To illustrate the extent of heat flux control that can be provided by controlled variations in the surface shape of conductive monoliths, a set of aluminum monoliths is modified by machining to produce parts with axially oriented grooves in the surfaces of the monoliths about their circumference. The resulting profiles, schematically illustrated in inset I in FIG. 2 of the drawings, are typified by a monolith M that incorporates two different tube-contact or tube-proximate portions $A_1$ and $A_2$, each presenting a different gap size ($G_1$ and $G_2$) within a single reactor tube T.

Figure 2:
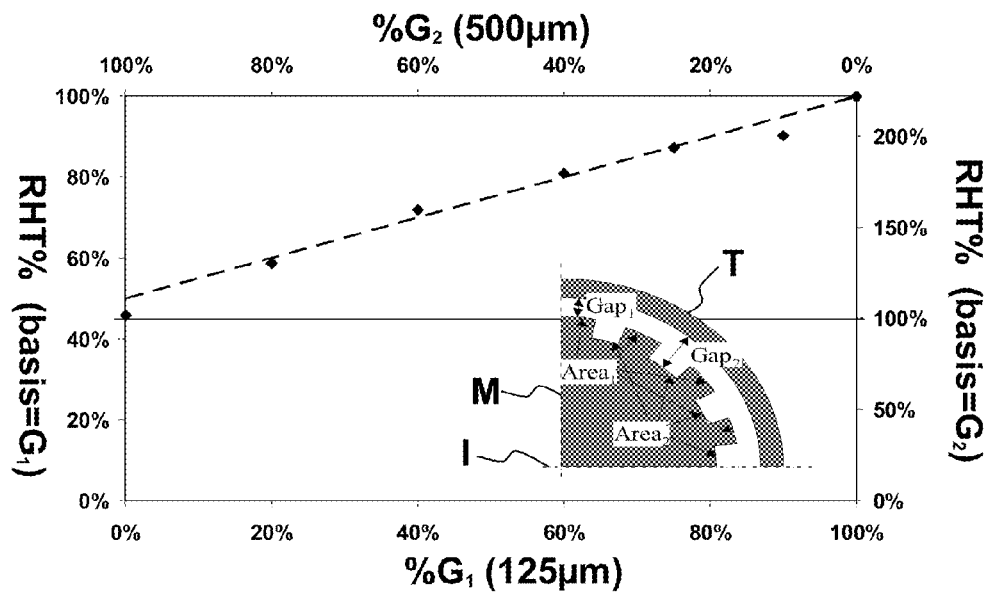
FIG. 2. is a graph plotting heat exchange efficiency as a function of effective gap size for axially relieved monolith designs disposed in a reactor tube.

The data plotted in FIG. 2 are for a monolith-tube combinations wherein the grooved surface portions $A_2$ result in a monolith-tube gap size of 500 μm, and the remaining or un-grooved surface portions A1 provide a monolith-tube gap of 125 μm. The data indicate that the heat-transfer efficiency of the monolith will vary linearly between the two limiting values of gap size, being at a maximum where the average gap size is 125 microns (no surface grooves) and at a minimum where the entire surface of the monolith is machined away to leave a 500 um gap. Significantly, even for the case where half of the monolith circumference is relieved to the 500 μm gap size, heat transfer efficiencies that are in excess of 150% of the baseline 500 μm gap are still realized if the remaining monolith circumference is shaped to operate at a gap of 125 μm.

These data indicate both importance of good contact between the monolith and tube, and the control over heat flux that can be achieved through designed gap control. A particularly simple and convenient method for utilizing gap control to control heat flux to the reactor tube is to use stacks of monolith segments of differing outer dimensions in a single tube. This approach can provide higher heat flux over some portions of the reactant flowpath through the tube and lower heat flux over other portions of that flowpath. The use of monolith segments of two, three, or more differing outer dimensions can thus permit relatively precise control of heat flux over the entire reactant flowpath through a multitubular reactor.

As noted above, a recognized characteristic of the ceramic pellet catalyst supports currently favored for use in multitubular reactors is susceptibility to the development of hot spots in the catalyst bed along the length of the reactor tubes. These hot spots lower the selectivity of the reactor and also pose a safety concern.

Addressing this problem does not require the complete replacement of pellet catalysts with monoliths in every case. One useful approach is to position heat conductive monolithic catalysts or catalyst supports, such as metal honeycombs, along the length of such reactor tubes at selected locations where it is essential to control the temperature of the fluid processing stream. The high heat conductivity of such monoliths along their flow axes (generally oriented parallel to the axes of the reactor tubes and the direction of fluid flow through those tubes) helps to reduce axial temperature gradients in the tubes. Then controlling the monolith-reactor tube gap to regulate radial heat flux to or from the reactant fluid via the outer wall of the reactor tube and the heat exchange fluid permits local heat extractions or additions to or from the process stream to be carried out at any desired location within a pellet bed.

Present monolith fabrication technologies applicable to the production of metal honeycombs for use as monolith segments include both metal honeycomb extrusion processes and sheet metal wrapping processes. Either of these methods is capable of producing monolith segments ranging from 1-100 cm in length and 2-15 cm in diameter. Segments having dimensions of length and diameter anywhere within these ranges are quite suitable for use in the practice of the invention.

The catalytic material applied to the monolith segments to promote the desired chemical reaction will in most cases be applied in form a coating onto the surface of the metal monolith. The application of such active catalyst phases onto the metal surface can be done by standard methods as they are known to those skilled in the art and for example used commercially to apply various metal oxides onto metal honeycombs used in the off-gas treatment of cars and other applications, in which hydrocarbons are catalytic oxidized. Catalyst application will typically be carried out prior to insertion of the monoliths into the reactor tubes, although subsequent catalyzation processing is also possible, and useful in some cases.

The material of the active phase will depend on the application and will in most cases be the same or a slight modification of what is used today with random packings. Typical catalyst materials include metals as Pt, Pd, Ag, Au, Rh, Re, Ni, Co, Fe, V, Ti, Cu, Al, Cr, etc. and their oxides, chlorides, sulfides etc. as well as combinations thereof. In some cases the metal monolith might have catalytic activity itself. In other cases the surface of the metal monolith may be modified prior to use for example by oxidizing or chloriding it. Changes to monolith surface morphology and structure useful to create or modify monolith wall porosity to provide appropriate ranges of pore size and size distribution are also possible and included.

A number of different methods may be used to fill the tubes of multi-tubular reactors with monoliths sized to establish average gap dimensions within the prescribed limits. For applications involving fluid processing at elevated temperatures, tube filling and gap control can be facilitated by selecting monolith segments having coefficients of thermal expansion higher than the expansion coefficients of the reactor tubes. Using this basis for selection, the tubes and monoliths can be of such dimensions as to leave small gaps (a non-interfering fit) between the tubes and monoliths while both are at a selected monolith mounting temperature.

Thereafter, as high temperature fluid processing commences within the environment of the operating reactor, the rising temperatures of the monoliths and tubes rise will cause greater expansion of the monolith segments than the reactor tubes. This will then reduce or eliminate the small gap and insure good proximity or conductive contact between the monolith surfaces and the reactor tube inside walls.

Alternatively, for the case of reactors designed to conduct endothermic reactions during which the monolith temperatures may be lower than the tube temperatures, a thermal expansion differential providing more rapid tube contraction than monolith contraction may be useful. In either case, returning the reactor to ambient temperatures at reactor shutdown generally restores the initial gap and thus aids monolith removal and/or replacement.

Examples of tube and monolith construction materials providing a positive monolith-tube thermal expansion differential include monoliths composed of aluminum or copper mounted within reactor tubes composed of nickel or steel. Copper and aluminum monoliths will exhibit average linear coefficients of thermal expansion of $20.2 \times 10^{-6}/°C$ and $27.4 \times 10^{-6}/°C$ over the temperature range 25-500° C., respectively, while stainless steels typically have expansion values in the range of $15$-$19 \times 10^{-6}/°C$, and carbon steels have values on the order of about $10 \times 10^{-6}/°C$.

Where a reactor application requires the use of materials not having thermal expansion differentials favoring easy mounting as above described, alternative mounting procedures may be employed. One such procedure relies on the fact that the thermal expansion coefficients of candidate materials for reactor tube construction will be positive, i.e., the materials will expand on heating. Taking advantage of this fact, the proper sizing of the monoliths and tubes for reactor assembly can include the step of heating the tubes and/or cooling the monolith segments to provide the necessary non-interfering or slidably interfering fit between these elements at the time of mounting. The subsequent cooling and shrinkage of the tubes and/or heat expansion of the monolith segments can firmly secure the segments within the tubes.

With knowledge of the expansion characteristics of the materials and control over the initial dimensions of the components, the sizing of the monolith and tube elements can accurately be adjusted to insure the maintenance of the required small or zero average gap size between the segments and tubes when both are at their projected operating temperatures within the reactor. Subsequent removal of the thus-mounted monolith segments following reactor shutdown can be facilitated, for example, by circulating a cooling fluid through the monoliths while circulating a heated fluid around the reactor tubes to re-create a temporary gap between the tubes and monoliths.

In some cases the sizing of the monolith segments and tubes to create or preserve a small gap during the mounting process is not feasible, and tube loading with a slidably interfering fit existing between the tubes and monoliths is necessary. By a slidably interfering fit is meant a contact fit between the monolith and tube such that the monolith fits more or less tightly within the tube bore, yet can be forced down the bore through the application of axial mounting force below the end-to-end compressive strength of the monolith segment or the reactor tube.

A number of approaches for mounting monolith segments into reactor tube bores sized for an interference fit can be employed. Where the interference is slight and only light force is needed for mounting, the monoliths can be propelled into position within the heat exchanger tube though inertial force. Apparatus for accomplishing inertial mounting is illustrated in FIG. 2 of the drawing. A pair of traction wheels 10 in the same plane and separated by a gap 12 slightly smaller than the diameter of a monolith segment 14 are caused to spin rapidly in opposite directions at high speed. Monolith segments 14 are then fed into gap 12 and propelled down bore 16 of reactor tube 18 the tube bore. Stops within the bore (not shown) can be provided to control the final positions of the segments within the tubes, if desired.

Figure 3:
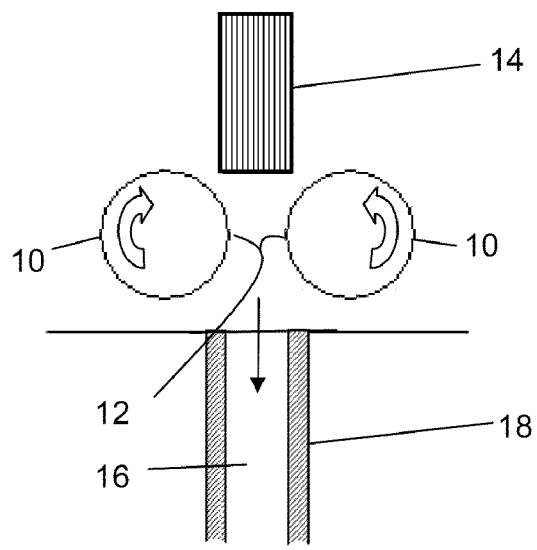
FIG. 3 illustrates apparatus for mounting monoliths in reactor tubes.
Figure 4:
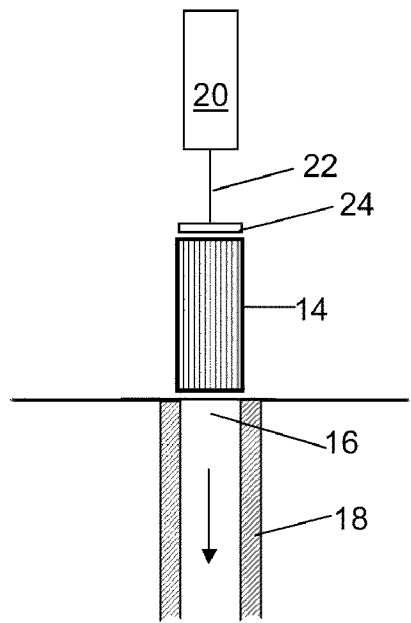
FIG. 4 illustrates alternative apparatus for mounting monoliths in reactor tubes.
Figure 5:
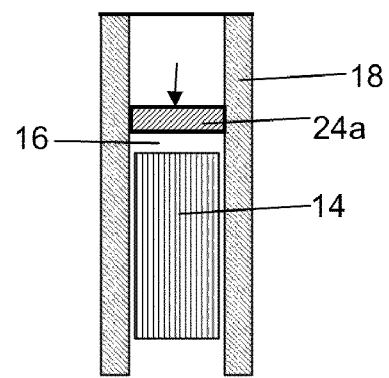
FIG. 5 illustrates further alternative apparatus for mounting monoliths in reactor tubes.

Pneumatic methods for mounting or pressing monolith segments in reactor tubes are illustrated in FIGS. 3 and 4 of the drawings. In FIG. 3, an air cylinder 20 provides downward driving force to a piston rod 22 and connected flat plunger 24 positioned against the top end of a monolith segment 14. Rapid actuation of air cylinder 20 can launch segment 14 toward and into bore 16 of reactor tube 18, or slow activation can be used to press the segment into the bore.

In FIG. 4, a reactor tube 18 acts as the outer circumferential wall of a pressure cylinder and a piston plate 24a is placed above a monolith segment 14 that has been started into bore 16. The piston plate is sized to provide tight seal against the reactor tube wall and air pressure is applied to the top of the piston plate to force the monolith segment downwardly into the tube. Means such as a wire or chain, not shown, may be connected to the piston plate for withdrawing it from the tube bore. Pneumatic procedures such as illustrated in FIGS. 3 and 4 can also be reversed to facilitate the unloading of monolith segments from reactor tubes.

As previously indicated, providing good shape conformity between the selected monolith segments and reactor tubes, and also reasonably smooth surfaces on both the outer portions of the monolith segments and the inner surfaces of the reactor tubes, are important factors in securing the gap control needed for efficient heat transfer within multi-tubular reactors. Presently, not all of the manufacturing methods available to form metal monoliths useful as catalyst supports for multi-tubular reactors produce monoliths with smooth surfaces. Extrusion methods, for example, which offer substantial advantages for the efficient production of high-wall-thickness, highly conductive honeycomb monoliths, can in some versions produce honeycombs with no skins, or with skins that do not present smooth cylindrical surfaces.

A preferred method for preparing such monoliths for use in multi-tubular reactors comprises inserting the monoliths into smooth-surfaced metal jacketing tubes. Through the use of conventional press-fitting or heat-shrinking techniques this method can provide monolith composites consisting of honeycomb cores in metal jacketing tubes that exhibit internal (core-jacket) heat conductivities as efficient as the internal conductivities of honeycomb monoliths manufactured with integral skins. Further advantages of using such metal jacketing approaches include the fact that tubing for providing such jackets is readily available with high thermal conductivity, excellent dimensional tolerances for outer diameter, and a high level of outer surface smoothness.

It will be recognized from the foregoing that the present invention will find use in a wide variety of chemical and petrochemical reactions and reactors in which radial heat transfer is crucial for the safe and economic operation of the reactor systems. This will include any of the reactions presently carried out in multi-tubular reactors incorporating arrays of relatively small diameter tubes submersed in external heat exchange media. Specific examples of such reactions include the partial oxidation of hydrocarbons to products such as ethylene oxide, formaldehyde, phthalic anhydride, maleic anhydride, methanol, and the like. Other examples include oxychlorination processes to products such as ethylene dichloride, the steam reforming of hydrocarbons to produce syngas ($CO+H_2$), and Fischer-Tropsch syntheses for the conversion of syngas to liquid hydrocarbons. Of course other reactions benefiting from improved temperature control, whether or not presently performed in multi-tubular reactors over solid catalysts, may also conducted to advantage in these monolith reactors.

In summary, the significantly narrower temperature ranges of reactor operation available through the use of the invention, which cannot effectively be implemented with conventional reactor technology, will enhance the safety of these processes, increase the life of the catalysts, and improve process selectivity towards the desired reaction and product. Additionally, the invention enables reactor operation at higher reactive heat loads, and thus higher throughputs per unit of time and volume, while at the same time incurring significantly lower pressure drops. The latter advantage reduces the load on pumps and compressors, decreases the operating and capital costs of the reactors, facilitates the use of higher recycle rates at equal or less compression demand, and enables reactor operation at more constant pressure levels. Finally, the grading, loading and design of the catalysts for these reactors is simplified since the stacking of monolith segments within reactor tubes is highly reproducible and easy.

The foregoing description of specific and preferred embodiments of the invention is intended to be illustrative rather than limiting, it being evident that various modifications of those specific embodiments may adapted for specific purposes within the scope of the appended claims.

We claim:

1. A method for assembling a multi-tubular reactor for processing a fluid stream in a processing temperature range, the reactor incorporating an array of reactor tubes filled with one or more monolith segments of a monolithic catalyst or catalyst support, which comprises the steps of:
    selecting a monolith segment of a monolithic catalyst or catalyst support structure, the segment being formed of a heat-conductive material having a first average linear coefficient of thermal expansion;
    selecting a reactor tube formed of a heat-conductive material having a second average linear coefficient of thermal expansion, wherein the first average linear coefficient of thermal expansion is greater than the second average linear coefficient of thermal expansion;
    sizing the monolith segment and/or the reactor tube to dimensions effective to provide (i) a non-interfering fit between the monolith segment and the reactor tube when each is at a selected monolith mounting temperature and when each is at ambient temperature at reactor shut-down, and (ii) an average gap distance between the reactor tube and the segment not exceeding about 250 µm when the monolith segment is filled with fluid at a temperature in the processing temperature range; and
    inserting the segment into the reactor tube.

2. A method in accordance with claim 1 wherein the step of sizing the monolith segment and/or the reactor tube involves the step of heating and/or cooling one or both of the monolith segment and reactor tube to a selected mounting temperature effective to provide a non-interfering fit therebetween.

3. A method in accordance with claim 1 wherein the monolithic catalyst or catalyst support is a composite comprising a honeycomb core element and a metal jacketing element.

4. A method for processing a fluid stream in a processing temperature range, with a reactor incorporating an array of reactor tubes filled with one or more monolith segments of a monolithic catalyst or catalyst support, which comprises the steps of:
    selecting a monolith segment of a monolithic catalyst or catalyst support structure, the segment being formed of a heat-conductive material having a first average linear coefficient of thermal expansion;
    selecting a reactor tube formed of a heat-conductive material having a second average linear coefficient of thermal expansion wherein the first average linear coefficient of thermal expansion is greater than the second average linear coefficient of thermal expansion;
    inserting the monolith segment into the reactor tube to provide (i) a non-interfering fit between the monolith segment and the reactor tube when each is at a selected monolith mounting temperature and when each is at ambient temperature at reactor shut-down, and (ii) filling the monolith segment with fluid at a temperature in a processing temperature range to achieve an average gap distance between the reactor tube and the segment not exceeding about 250 µm.

5. A method in accordance with claim 4, which further comprises returning the reactor to the selected monolith mounting temperature with a non-interfering fit between the monolith segment and reactor tube.

* * * * *